V. L. ELLICOTT.
METHOD OF AND APPARATUS FOR DETERMINING PHOTOGRAPHIC EXPOSURES.
APPLICATION FILED JAN. 14, 1920.
1,385,940.
Patented July 26, 1921.
2 SHEETS—SHEET 1.
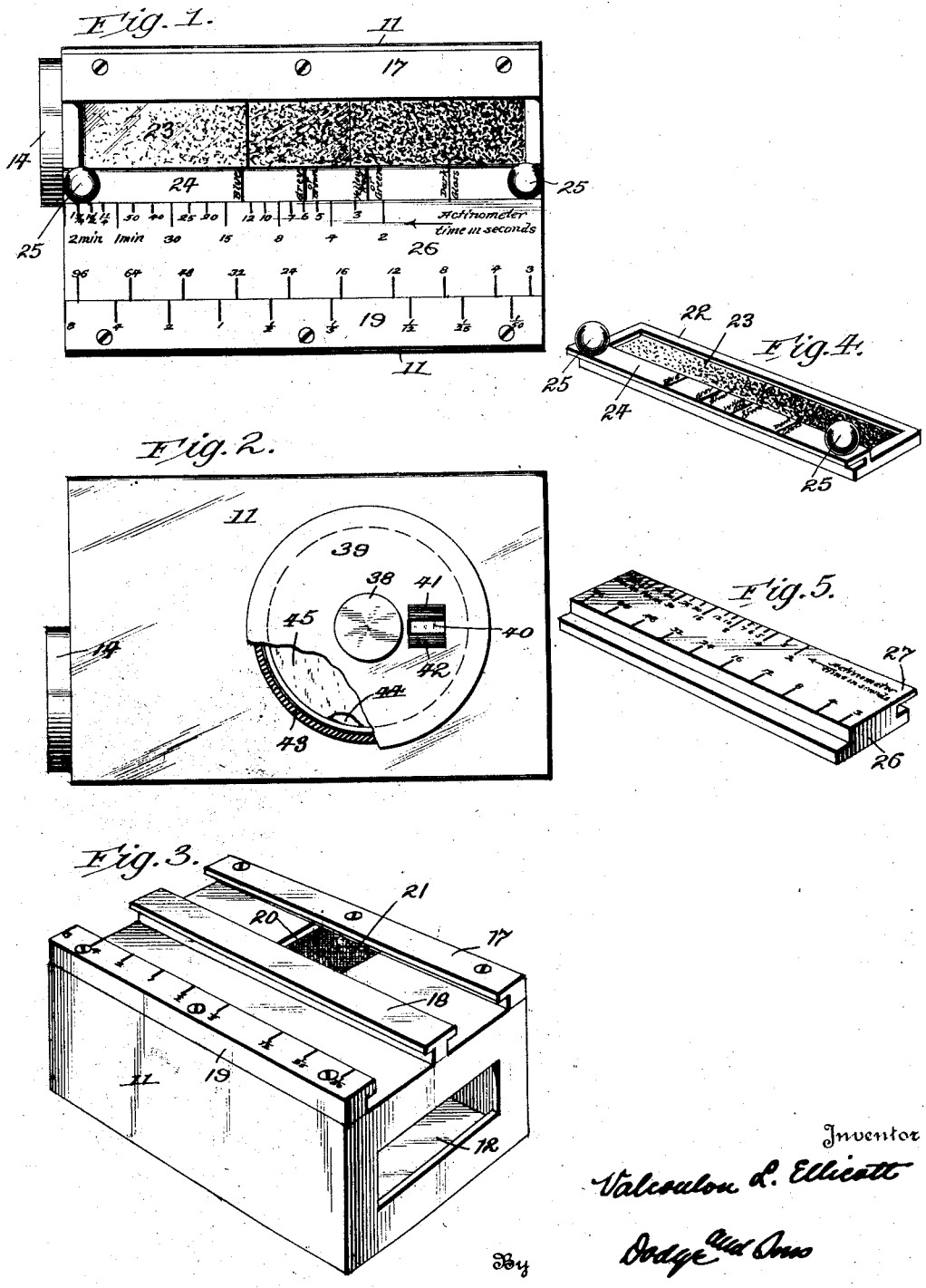

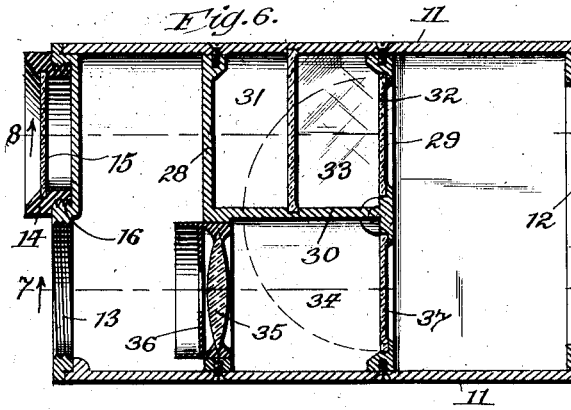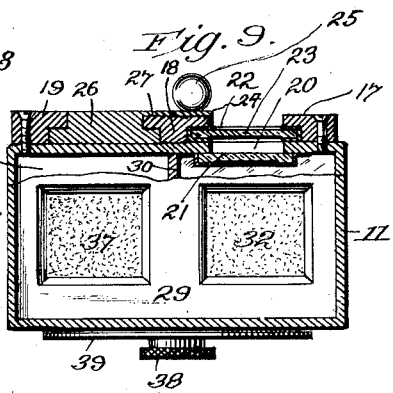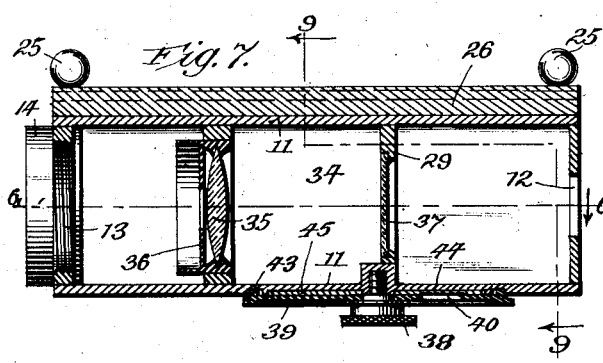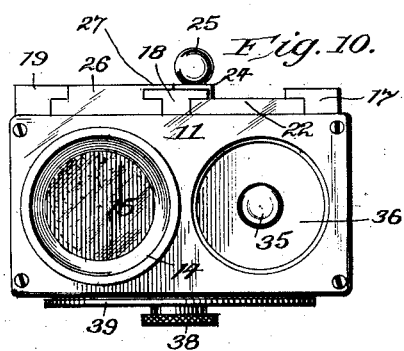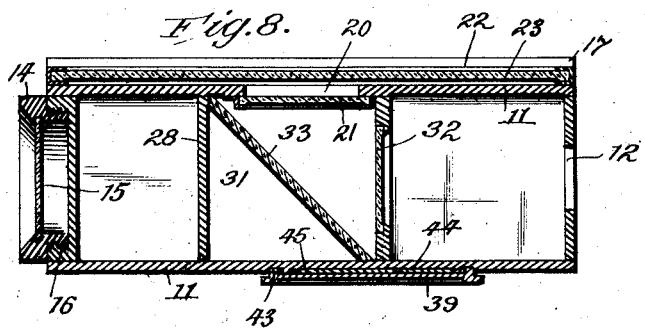

UNITED STATES PATENT OFFICE.

VALCOULON L. ELLICOTT, OF BALTIMORE, MARYLAND.

METHOD OF AND APPARATUS FOR DETERMINING PHOTOGRAPHIC EXPOSURES.

1,385,940.   Specification of Letters Patent.   Patented July 26, 1921.

Application filed January 14, 1920. Serial No. 351,471.

*To all whom it may concern:*

Be it known that I, VALCOULON L. ELLICOTT, a citizen of the United States, residing at Baltimore, in the State of Maryland, have invented certain new and useful Improvements in Methods of and Apparatus for Determining Photographic Exposures, of which the following is a specification.

This invention relates to a method of and apparatus for determining photographic exposures. Broadly stated, the invention involves the conjoint use of a photometer and an actinometer to determine photographic exposures, the object being to eliminate estimation and to avoid the use of empirical correction factors.

Heretofore it has been proposed to use photometers alone to determine photographic exposures. These have been of two types. One is based on limit of visibility and is practically useless because limit of visibility depends as much upon the physiological condition of the eye as upon the brightness of the image. The other was based on the use of a standard light and is a practical failure because the standard light cannot by any means now known, be maintained constant in a portable device.

Actinometers have been used with considerable success. The usual type involves timing a photo-chemical reaction, *i. e.*, the determination of the time which a special photographic printing-out paper requires to turn from one standard color to another standard color when exposed to the light to be measured. Devices of this kind can measure only the light falling on the subject or the light falling upon the observer. Since the exposure is determined by the light coming from the subject to the observer or camera it is necessary to introduce correction factors based on the nature of the subject. The estimation of such factors is often a source of serious error.

The ideal manner of determining exposures by using a printing-out paper would be to expose it in a camera and determine the time which it took to form a satisfactory image. However, printing-out papers now available are too slow to permit such use, and if their speed could be increased it would nevertheless be very difficult, if not impossible, to observe them while undergoing exposure without subjecting them to extraneous light.

I have, however, devised a rapid method for accomplishing a substantially equivalent result with commercial actinometer papers. This method consists in making two substantially simultaneous determinations, one of which is a photometric comparison of the light intensity of an image of the subject to be photographed and the intensity of light which falls from the source of light upon the observer; and the other of which is a measurement with an actinometer of the actinic intensity of the light falling from the source of light upon the observer. From the above two determinations the correct exposure may readily be computed. The only undetermined factor exerting an effect on the result is the color of the subject to be photographed. The error introduced by this factor is for ordinary subjects well within the chromatic and exposure range of commercial plates. Where greater precision is necessary empirical correction can be introduced, but it will be noted that such correction involves a perception of color only and hence is not affected by the accommodation of the pupil of the eye to light intensity.

My invention further contemplates a compact instrument employing the method above defined and including in a single structure the necessary photometer and actinometer and a computing rule. The parts are so related that one element of the computing rule is adjusted by the manipulation of the photometer, the other being manually set according to the actinometer time. When so set the computing rule gives the correct exposures for a substantial range of lens apertures.

A device embodying the features of this invention is illustrated in the accompanying drawings, in which:—

Figure 1 is a top view of the complete device;

Fig. 2 is a bottom view of the complete device;

Fig. 3 is a perspective view looking from the left rear end of the device with the photometer slide and the computing slide both removed;

Fig. 4 is a perspective view of the photometer slide;

Fig. 5 is a perspective view of the computing slide;

Fig. 6 is a horizontal longitudinal section on the line 6—6 of Fig. 7 looking in the direction of the arrows;

Fig. 7 is a vertical longitudinal section on the line 7—7 of Fig. 6 looking in the direction of the arrows;

Fig. 8 is a vertical longitudinal section on the line 8—8 of Fig. 6 looking in the direction of the arrows;

Fig. 9 is a transverse section on the line 9—9 of Fig. 7 looking in the direction of the arrows; and Fig. 10 is a front elevation of the complete device.

A sheet metal body or case 11 houses the various parts of the instrument. A horizontal slot 12 extends across the rear end of the case 11, and through the slot 12 the observer looks in making the photometric comparison. The front end of the case is formed at its left side with a threaded round aperture 13. This is designed to receive at certain times a threaded mount 14 which carries a screen 15 of smoked or colored glass. When not in use the mount 14 is screwed into a blind socket 16 formed at the right side of the front of the case. The top of the case is formed with three overhanging guides 17, 18 and 19. Between the guide 17, which is at the right side of the case, and the middle guide 18, and at a point about midlength of the case 11, is an aperture 20 covered by a ground glass 21. Sliding between the guides 17 and 18 is a frame 22 which carries a glass 23. The glass is transparent at one end and is almost opaque at the opposite end, the intervening portion shading gradually from one to the other. Consequently, by moving the frame 22 back and forth over the ground glass window 21 the amount of light admitted through this window can be varied through a wide range.

Ordinarily the glass 23 will be given a neutral tint but it is conceivable that for special purposes, such for example, as where the device is to be used with plates having special color sensitiveness, or with a light source having a special spectrum, the glass 23 might be given special tints. Its prime function, of course, is to adjust the amount of light admitted through the ground glass window 21. The purpose of using ground glass in the window 21 is to secure even light dispersion. The frame 22 has a flange 24 which partly overhangs the guide 18 and bears graduations later to be described. Knobs 25 are provided for convenience in moving the frame 22.

A computing slide 26 is mounted between the guides 18 and 19 and has a flange 27 which also partly overhangs guide 18. The overhanging edges 24 and 27, of the frame 22 and slide 26 respectively, meet so that the graduations on part 24 may be read against a coacting series of graduations on the slide 26.

The interior of the case 11 is provided approximately into thirds by transverse vertical partitions 28 and 29 and the middle space between the two partitions is sub-divided by a vertical longitudinal partition 30 into chambers of approximately equal width. The right hand chamber 31 is directly beneath the ground glass window 21. It is closed at its front end by the partition 28, but a ground glass window 32 is mounted in the partition 29 at the rear end of the chamber 31. A mirror or other reflecting surface 33 is mounted in the chamber 31 at an angle of 45° and serves to reflect the light entering through the window 21 onto the ground glass window 32.

The space 34 at the left of the partition 30 serves as a small camera or finder. A lens 35 with a diaphragm 36 is mounted in the partition 28 at the front end of this chamber and a ground glass 37 substantially identical with the ground glass 32 is mounted in the partition 29 at the rear end of this chamber. The focal length of the lens 35 is such that the lens gives a substantially universal focus on the ground glass 37. It will be noted that the axis of the lens 35 passes through the center of the threaded opening 13.

A combined clamp and pivot screw 38 is threaded into the bottom of the case 11 and swiveled on this is a disk 39 having a small slot 40. On either side of the slot 40 are two colored areas, the first of which, 41, is the color of the actinometer paper after exposure, and the second of which, 42, is an intermediate shade for use in dim lights to permit the making of a shorter test exposure, which is used with a correction factor. The disk 39 has a flange 43 which runs in a circular groove formed in the case 11 and a disk 45 of actinometer paper (for example, Wynne's "dead-match" paper) is confined in a recess 44 in the case within the flange 43 and under the disk 39. The disk 39 is frictionally retarded by the screw 38 but may be turned to expose successive small areas of the paper 45 through the aperture 40. This is to all intents and purposes the same arrangement as is used in commercial types of actinometer.

As already suggested, the frame 22 and slide 26 carry coöperating scales. These may be variously arranged and will assume various forms according to the nature of the light and plate and according to the degree of refinement desired from the use of the device. In fact, the scale may, as in various prior devices, include a number of different scales arranged parallel to each other and may involve the use of different index marks intended to correspond to different plate emulsions and the like. Details of this character are well known in actinometers and other exposure meters, and in order to avoid complicating the drawings I have omitted such features and have shown the device as arranged for use with a single sensitive emulsion.

In its simplest form the flange 24 on frame 22 would carry a single index line for normal purposes and a second index marked dark glass for use when the amount 14 is screwed into the aperture 13, thus bringing the dark glass 15 in front of the lens 35. For purposes of illustration, however, I have shown in the drawings a plurality of index lines for use when the dark glass is not in front of the lens, these index lines being intended for use when the subject has a predominant blue tone or a predominant gray or brown tone, or a predominant red, yellow or green tone. The three index lines are marked in the drawings with legends corresponding to the above descriptions.

The overhanging edge 27 of the slide 26 which, as has been stated, lies against the index lines on the overhanging flange 24 of frame 22 is appropriately graduated in terms of the actinometer time in seconds. The opposite edge of the slide 26 contacts with the guide 19 and this edge and the guide bear two series of graduations, one giving lens aperture and the other time of exposure in seconds. In the drawings the aperture scale is shown on the slide 26 and the exposure scale is shown on the guide 19.

To use the device the operator stands at or near the camera holding the case 11 before him facing the object to be photographed. It is advantageous to hold the meter out of direct sunlight but exposed to light from the sky, though any source of light which is present may be used as the actinic light. While so holding the device he directs it at the subject to be photographed so that the lens 36 throws an image of that subject upon the ground glass 37. He then manipulates the slide 26, moving it back and forth until the illumination of the ground glass 32 is approximately equal to the average brightness of the image on the ground glass 37. Since the transparency of the glass 23 varies throughout its length the position assumed by the frame 22 when the glasses 32 and 37 are equally illuminated is a function of the relative intensity of the light coming from the subject to the observer and the light coming from the light source to the observer. The adjustment of the frame 22 necessarily adjusts the positions of the index lines on the overhanging flange 24. Without moving the slide 26 the user inverts the device and measures the time necessary to cause a fresh area of the actinometer paper to match the color spot 42. He then turns the device back and sets the slide 26 so that with frame 22 in its adjusted position the number of seconds of exposure of the actinometer paper is opposite the proper index on flange 24. As stated, the proper index to use is determined, in the more refined form of the device, by the prevailing color of the subject to be photographed. The resulting position of the slide 26 is therefore a function, first, of the ratio of the light coming from the subject to the observer to the light falling from the source on the observer, second, of the actinic intensity of the light falling from the source on the observer, and third, (in case individual indexes are used for different colors) of the color of the subject to be photographed. The position of the scale 26 determines the relation between the exposure and aperture scales and shows at a glance the correct exposure to use for any chosen aperture.

The purpose of the mount 14 and smoked glass 15 is to reduce the brilliance of the image on the ground glass 37 in certain cases, and thus extend the range of usefulness of the instrument. One instance where this smoked glass is useful is where a landscape is to be photographed with the camera in a deeply shaded position. In such a case the light falling on the observer would be relatively weak, though the subject would be brightly illuminated. Other known means for reducing the light passing through the lens may obviously be used.

In cases where the glass 23 is given special tints as already suggested it may be desirable to use colored screens over the lens 36. These can be set in mounts like the mount 14 and can be screwed into place when needed. Cases of this sort might arise, where artificial light having a very unbalanced spectrum was to be used, or where plates of peculiar color sensitiveness were to be used. Under these exceptional conditions the photometric comparisons can to advantage be made with the lens and reflecting chamber screened to the photographically active color. Various modes of mounting such colored screens will readily suggest themselves.

The invention avails of the accuracy of commercial actinometers, and enhances this by the elimination or simplification of the estimated or empirical correction factor. In the prior devices the correction involves at least three independently variable factors, (1) ability of subject to reflect light, (2) actinic value (color) of this reflected light, (3) distance from camera. My invention eliminates (1) and (3), while (2) is negligible for average subjects. Where it must be estimated, color sense is all that is required. Furthermore, with modern plates perfect chromatic balance is being closely approached and similar improvement in actinometer papers can be expected in the near future. The precision of my method and apparatus obviously increases with the use of such improved plates and paper.

What is claimed is:—

1. That method of determining photographic exposures which consists in determining the actinic intensity of light falling upon the observer, making a photometric comparison of said light and the light reflected from the subject to the observer and expressing the exposure as a function of the two values thus determined.

2. That method of determining photographic exposures which consists in determining the actinic intensity of light falling upon the observer, making a photometric comparison of said light and the light reflected from the subject to the observer, and expressing the exposure as a function of the two values thus determined and of a correction factor based on the color of the subject.

3. That method of determining photographic exposures which consists in producing an image of the subject to be photographed, determining the actinic intensity of the light falling upon the observer, making a photometric comparison of said light and said image, and expressing the exposure as a function of the two values thus determined.

4. That method of determining photographic exposures which consists in producing an image of the subject to be photographed, determining the actinic intensity of the light falling upon the observer, making a photometric comparison of said light and said image, and expressing the exposure as a function of the two values thus determined and of a correction factor based on the color of the subject.

5. That method of determining photographic exposures which consists in timing a photochemical reaction induced by light received from the light source at the point of observation; making a photometric comparison of said light and the light reflected from the subject to the same point of observation; and expressing the exposure as a function of said time and of the ratio determined by said comparison.

6. That method of determining photographic exposures which consists in producing at the point of observation an image of the subject to be photographed, timing a photo-chemical reaction induced at the point of observation by light falling from the light source, making a photometric comparison of said light and said image; and expressing the exposure as a function of said time and the ratio determined by said comparison.

7. An exposure meter comprising in combination a finder camera including a screen; a second and adjacent screen adapted to receive light from the sky; a moving part adapted to vary the intensity of light received by said second screen; an actinometer subject to light from the sky, and a mechanical computing device connected with said moving part to be moved thereby and including an exposure scale and an actinometer scale.

8. An exposure meter comprising in combination in a single organized structure a comparison photometer, serving to compare image forming light with available light and having a moving adjusting part; a mechanical computing device operable by the movement of said adjusting part and including coöperative actinometer and exposure scales; and an actinometer serving to determine the correct reading for said actinometer scale for the light at the time of observation.

9. The combination of an actinometer and a comparison photometer comprising two adjacent screens, a lens for throwing an image on one screen; means for admitting light to the other screen; an adjusting device serving to vary the relative illumination of said screens to permit their equalization; and a scale associated with said adjusting device, said scale being graduated in terms of the actinometer readings.

10. The combination of an actinometer and a comparison photometer comprising two adjacent screens; a lens for throwing an image on one screen; means for admitting light to the other screen; an adjusting device serving to vary the relative illumination of said screens to permit their equalization, and a movable computing element associated with said adjusting device movable relatively thereto and provided with actinometer and exposure scales, said actinometer scale being graduated in terms of the actinometer readings.

11. The combination of an actinometer and a comparison photometer comprising two adjacent screens, a lens serving to throw an image over one screen; means for admitting light to the other screen; color screens for controlling the color of light admitted to said two adjacent screens; adjusting means serving to vary the relative illumination of said screens to permit their equalization; and a scale associated with said adjusting means, said scale being graduated in terms of the actinometer readings.

In testimony whereof I have signed my name to this specification.

VALCOULON L. ELLICOTT.